(12) United States Patent
Mirjan

(10) Patent No.: US 12,159,474 B2
(45) Date of Patent: Dec. 3, 2024

(54) METHODS AND SYSTEMS OF HANDWRITING RECOGNITION IN VIRTUALIZED-MAIL SERVICES

(71) Applicant: Hasan Mirjan, Santa Monica, CA (US)

(72) Inventor: Hasan Mirjan, Santa Monica, CA (US)

( * ) Notice: Subject to any disclaimer, the term of this patent is extended or adjusted under 35 U.S.C. 154(b) by 425 days.

(21) Appl. No.: 17/233,541

(22) Filed: Apr. 19, 2021

(65) Prior Publication Data
US 2022/0012510 A1 Jan. 13, 2022

Related U.S. Application Data

(63) Continuation-in-part of application No. 16/410,800, filed on May 13, 2019, now Pat. No. 11,036,976.

(60) Provisional application No. 62/672,753, filed on May 17, 2018.

(51) Int. Cl.
*G06V 30/226* (2022.01)
*G06F 16/22* (2019.01)
*G06V 30/19* (2022.01)
*G07B 17/00* (2006.01)
*H04W 4/029* (2018.01)
*H04W 4/12* (2009.01)
*G06N 20/00* (2019.01)

(52) U.S. Cl.
CPC ............ *G06V 30/226* (2022.01); *G06F 16/22* (2019.01); *G06V 30/19* (2022.01); *G07B 17/00467* (2013.01); *H04W 4/029* (2018.02); *H04W 4/12* (2013.01); *G06N 20/00* (2019.01)

(58) Field of Classification Search
CPC .... G07B 17/00467; G07B 2017/00709; G07B 2017/00725; H04W 4/029; H04W 4/12; G06N 20/00; G06N 3/08; G06V 30/424; G06F 16/9537
See application file for complete search history.

(56) References Cited

U.S. PATENT DOCUMENTS

| | | | | |
|---|---|---|---|---|
| 10,521,761 | B2* | 12/2019 | Lievens | G06Q 10/0832 |
| 10,643,171 | B1* | 5/2020 | Zhang | G06Q 10/08355 |
| 11,301,800 | B1* | 4/2022 | Bhagwat | G06K 7/1413 |
| 11,322,029 | B2* | 5/2022 | Nelson | G01C 21/362 |
| 11,556,970 | B2* | 1/2023 | Ferguson | G01C 21/343 |
| 11,620,611 | B2* | 4/2023 | Lievens | G06Q 10/08355 705/28 |
| 2004/0177110 | A1* | 9/2004 | Rounthwaite | G06Q 10/107 709/202 |
| 2014/0180959 | A1* | 6/2014 | Gillen | G01S 19/14 705/341 |
| 2016/0294758 | A1* | 10/2016 | Farhat | H04L 51/214 |
| 2018/0060812 | A1* | 3/2018 | Robinson | G06Q 40/02 |
| 2020/0043073 | A1* | 2/2020 | Greenberger | G06Q 10/0836 |
| 2021/0390502 | A1* | 12/2021 | Phillips | G06F 18/22 |
| 2022/0058576 | A1* | 2/2022 | DeLuca | G06N 20/00 |

* cited by examiner

Primary Examiner — Wesley J Tucker

(57) ABSTRACT

In one aspect, a computerized method useful for dynamic location-based virtualized mail services includes the step of determining an identity of a user receiving a physical mail. The method includes the step of determining a location of the user. The method includes the step of determining a set of delivery locations within a specified distance of the user's current location. The method includes the step of communicating, via an electronic message, the delivery location to the user's mobile device.

7 Claims, 12 Drawing Sheets

METHODS AND SYSTEMS OF HANDWRITING RECOGNITION IN VIRTUALIZED-MAIL SERVICES

CROSS-REFERENCE TO RELATED APPLICATIONS

This application claims priority to and is a continuation in part of U.S. patent application Ser. No. 16/410,800 filed on May 13, 2019. This application is hereby incorporated by reference in its entirety.

U.S. patent application Ser. No. 16/410,800 claims priority to U.S. provisional patent application No. 62/672,753, titled METHODS AND SYSTEMS OF VIRTUALIZED-MAIL SERVICES and filed on 17 May 2018. This application is hereby incorporated by reference in its entirety.

BACKGROUND

1. Field

This application relates generally to optical character recognition, and more particularly to a system, method and article of manufacture of hand-writing recognition in virtualized-mail services.

2. Related Art

Users and companies can receive enormous amounts of mail. Various mail management services have been created to help manage user incoming mail. Incoming mail can include both typed and/or handwritten information on the envelope/box. Handwritten address information can be reviewed by humans in order to be correctly forwarded to the recipient. This can increase the cost of mail management and decrease the competitiveness of the mail management service. Accordingly, improvements to automatically handling review and analysis of handwritten mail information is desired.

BRIEF SUMMARY OF THE INVENTION

In one aspect, a computerized method useful for dynamic location-based virtualized mail services includes the step of determining an identity of a user receiving a physical mail. The method includes the step of determining a location of the user. The method includes the step of determining a set of delivery locations within a specified distance of the user's current location. The method includes the step of communicating, via an electronic message, the delivery location to the user's mobile device.

Figure 1:
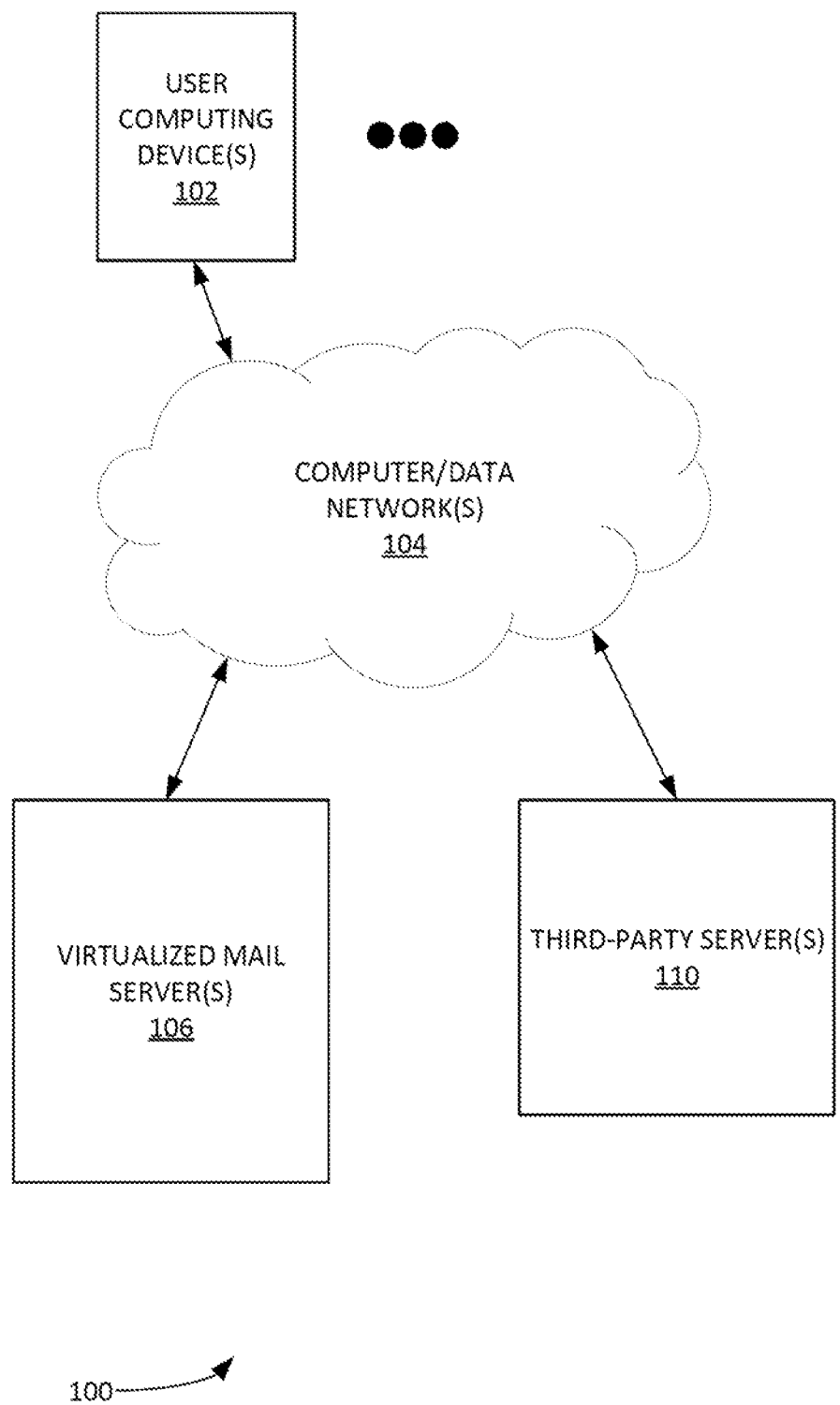
FIG. 1 illustrates an example system for implementing virtualized mail services, according to some embodiments.

The Figures described above are a representative set, and are not an exhaustive with respect to embodying the invention.

DESCRIPTION

Disclosed are a system, method, and article of a virtualized-mail services. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided. These definitions can be used by various systems herein.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Global Positioning System (GPS) is a satellite-based radionavigation system.

Handwriting recognition (HWR) can include functionalities that enable a computer to receive and interpret intelligible handwritten input from sources such as paper documents, photographs, touchscreens and other devices. The image of the written text can be sensed from a piece of paper by optical scanning (OCR) or intelligent word recognition. HWR can handle formatting, segmentation into characters and location the most plausible words. Both off-line and on-line HWR techniques can be utilized.

Location-based service (LBS) is a general term denoting software services which utilize geographic data and information to provide services or information to users.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Natural-language generation (NLG) can be a software process that transforms structured data into natural language. NLG can be used to produce long form content for organizations to automate custom reports. NLG can produce custom content for a web or mobile application. NLG can be used to generate short blurbs of text in interactive conversations (e.g. with a chatbot-type system, etc.) which can be read out by a text-to-speech system. It is noted that text-to-speech systems can be used herein.

Predictive Analytics includes the finding of patterns from data using mathematical models that predict future outcomes. Predictive Analytics encompasses a variety of statistical techniques from data mining, predictive modeling, and machine learning, that analyze current and historical facts to make predictions about future or otherwise unknown events. In business, predictive models exploit patterns found in historical and transactional data to identify risks and opportunities. Models can capture relationships among many factors to allow assessment of risk or potential risk associated with a particular set of conditions, guiding decision-making for candidate transactions.

Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set.

Optical character recognition (OCR) can include the electronic conversion of images of typed, handwritten or printed text into machine-encoded text from a scanned document or digital photograph of a document.

Exemplary Systems

FIG. 1 illustrates an example system for implementing virtualized mail services, according to some embodiments. System 100 can provide virtualized mail services to a plurality of users. System 100 can implement the various processes provided infra, including, processes 400-800.

Networks 104 can include the Internet, text messaging networks (e.g. short messaging service (SMS) networks, multimedia messaging service (MMS) networks, proprietary messaging networks, instant messaging service networks, email systems, etc. Networks 104 can be used to communicate messages and/or other information (e.g. videos, forms, text files, livestreams, push notifications, etc.) from the various entities of system 100.

System 100 can include a virtualized mail server(s) 106. User-computing devices 102 can be any computing device used by a user to access/consume/manage virtualized mail content provided by system 100 (e.g. via virtualized mail server(s) 106). Example user-computing devices can include, inter alia: personal computers, mobile devices, augmented reality devices, virtual reality devices, tablet computers, etc. User-computing devices 102 can access virtualized mail content via a website, local mobile device application and the like. User-computing devices 102 can include an application for managing virtualized mail settings. User-computing devices 102 can enable a user to upload registration and other virtualized mail related content to virtualized mail server(s) 106. User-computing devices 102 can enable a download virtualized mail applications from virtualized mail server(s) 106.

Virtual mail server(s) 106 can manage and provide virtual mail services to user-computing devices 102. Virtual mail server(s) 106 can include functionalities for implementing, inter alia: user notifications, OCR/HWR operations, manage printers and label printing, robot managers for opening and scanning physical mail and/or turning pages of physical mail, etc. Virtual mail server(s) 106 can include web servers, email servers, IM servers, text messaging systems, computer vision systems, machine learning systems, database management systems, etc.

Virtual mail server(s) 106 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia:

decision tree learning, association rule learning, artificial neural networks, inductive logic programming, support vector machines, clustering, Bayesian networks, reinforcement learning, representation learning, similarity and metric learning, and/or sparse dictionary learning. Machine learning techniques can be used to automatically improve OCR techniques, junk mail identification, and the like.

Virtual mail server(s) 106 can include a machine learning engine. The machine learning engine can utilize machine learning algorithms to recommend and/or optimize various peer-to-peer delivery services. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity, and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (e.g. in cross-validation), the test dataset is also called a holdout dataset.

Virtual mail server(s) 106 can implement various specific virtualized mail services such the following. It is noted that an expedited scan request can be implemented when the user requests expedite scanning. An administrator (e.g. a human or AI-based administrator) can be notified via phone notifier or email of the expedited request. An application can then be set to scan the order and the scan job can be processed. Virtual mail server(s) 106 can enable multiple forward addresses and support unlimited forwarding addresses. For example, a user can specify each mailing address to be forwarded to a different location. When processed, the virtual mail server(s) 106 can attach each mail item to the forwarding address. Virtual mail server(s) 106 can batch/group mail shipping. For example, a customer may request that their mail to be grouped forwarded one weekly, bi-weekly or monthly basis. Virtual mail server(s) 106 can then automatically notify an administrator via SMS, email and/or push notification. Virtual mail server(s) 106 can notifies a shipping courier for pick-up based on the duration set. Virtual mail server(s) 106 can forward mail based on the location of the user. Virtual mail server(s) 106 can verify the location of the user (e.g. using geolocation techniques based on the user's mobile device location, etc.). Virtual mail server(s) 106 can then query the user to determine that the new location is where mail needs to be shipped. Virtual mail server(s) 106 can receive a confirmation from the user. Virtual mail server(s) 106 can then forward the user's physical mail to said location and the physical mail can processed to the new address (e.g. for a specified period of time as indicated by the user in the confirmation, while it is detected that the user remains at the location, etc.). It is noted that a customer may add more than one forwarding address. Customer can also request forwarding of physical mail to any of a set of pre-stored forwarding addresses (e.g. based on an identifier of the sender, date of receipt, etc.). Virtual mail server(s) 106 can automatically attach a separate forwarding address to each physical mail item. An administrator can complete the forward by clicking on the mail. Shipping postage can be calculated based on the mail item type and address to be shipped to. Virtual mail server(s) 106 can automatically generate postage labels for printing. Virtual mail server(s) 106 can implement automated page counts. Virtual mail server(s) 106 can enable users to request scans of all or specified portions of physical mail. Virtual mail server(s) 106 can then scan the specified pages. Virtual mail server(s) 106 can perform an automatic page count but discards count based on the following conditions: when a page is blank, when a page has only header or footer text (e.g. page m of page set n, one-line header or footer, etc.). Virtual mail server(s) 106 can perform shipping carrier notifications for pickup with pre-paid shipping labels.

Virtual mail server(s) 106 can enable a text-to-speech option for providing a user's mail content via an audible source. Virtual mail server(s) 106 can use various AI/machine learning methods to optimize the processing of user requests. For example, a user can request a scan, a shredding operation, forwarding of specified mail based on sender, etc. Initially, virtual mail server(s) 106 can automatically set any of requested status based on mail type, request history with a verify that the action is to be taken automatically if not manually changed. For example, when a mail item arrives virtual mail server(s) 106 can enable the user to request a text-to-speech method for accessing the mail content (e.g. the user is driving or busy with other tasks while wants to read the mail content). In this way, the mail content can be audibly provided to the user (e.g. as a podcast format with specified access and security protocols to listen to). Machine learning, computer vision methods and image recognition can be utilized. For example, if the user has made a previous request, the Virtual mail server(s) 106 can obtain a digital image of the mail content (e.g. in a typed or handwritten or any type of font face, images or files type, etc.) and automatically learn the behavior(s) therein. Virtual mail server(s) 106 can convert the image file to a binary file (e.g. digital text) or re-renders an image to a text, a speech or a drawing, etc. In this way, virtual mail server(s) 106 can learn each users' behavior/preferences and then can act accordingly with all available functions with or without human intervention.

Figure 2:
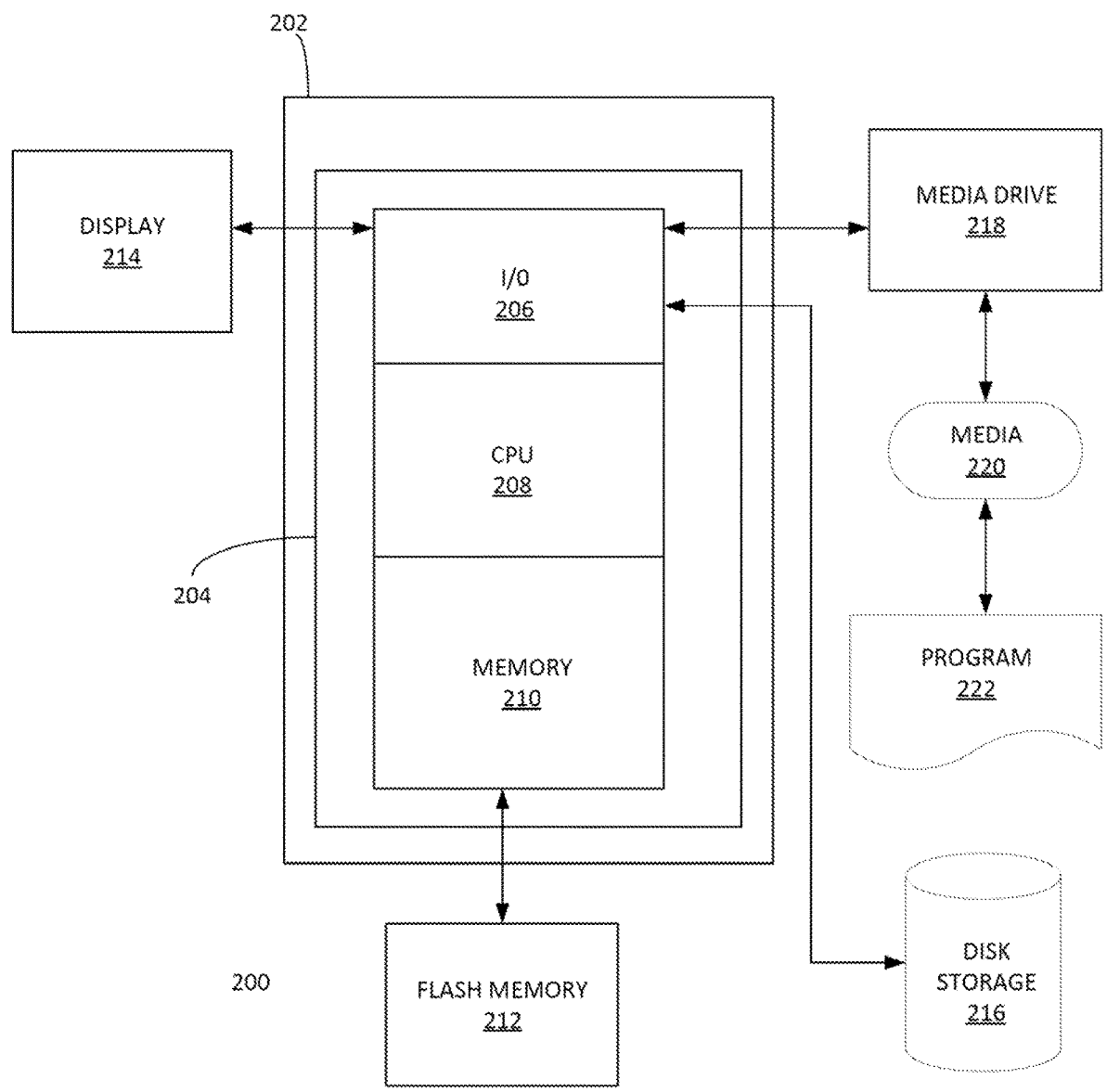
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
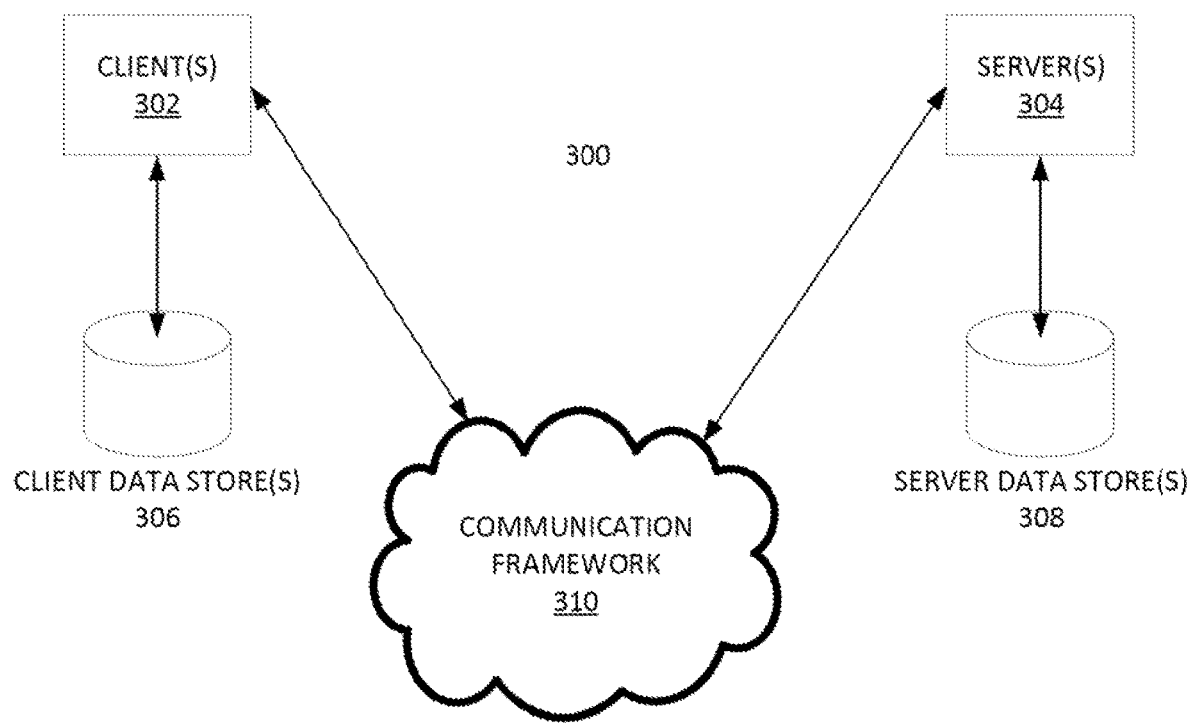
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can be a collection of remote computing services constituting a cloud-computing platform.

Example Methods

Figure 4:
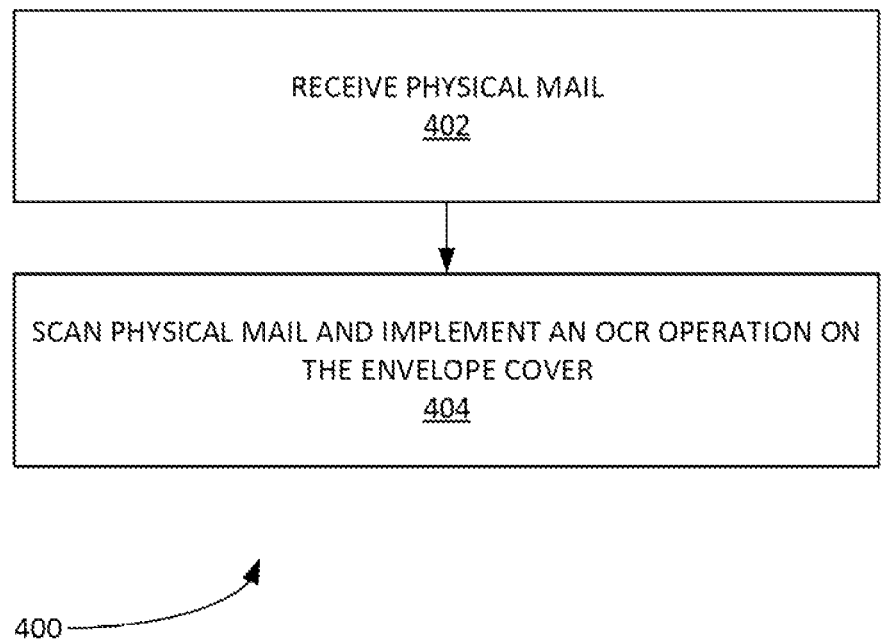
FIG. 4 illustrates an example process for a mail entry recognition system for typed or handwritten envelopes, according to some embodiments.

FIG. 4 illustrates an example process 400 for a mail entry recognition system for typed or handwritten envelopes, according to some embodiments. In step 402, a postal mail is received. In step 404, the physical mail envelopes contents are obtained by taking a digital photograph of the envelope using a mobile device. An OCR operation can be implemented on envelopes contents. A sender, recipient and other postal information can be determined. Process 400 can read the label(s) and automatically save the information to a database. This information can then be used to trigger other relevant processes in the mail virtualization system (e.g. notifications, virtualized mail delivery to a virtual inbox, etc.).

Figure 5:
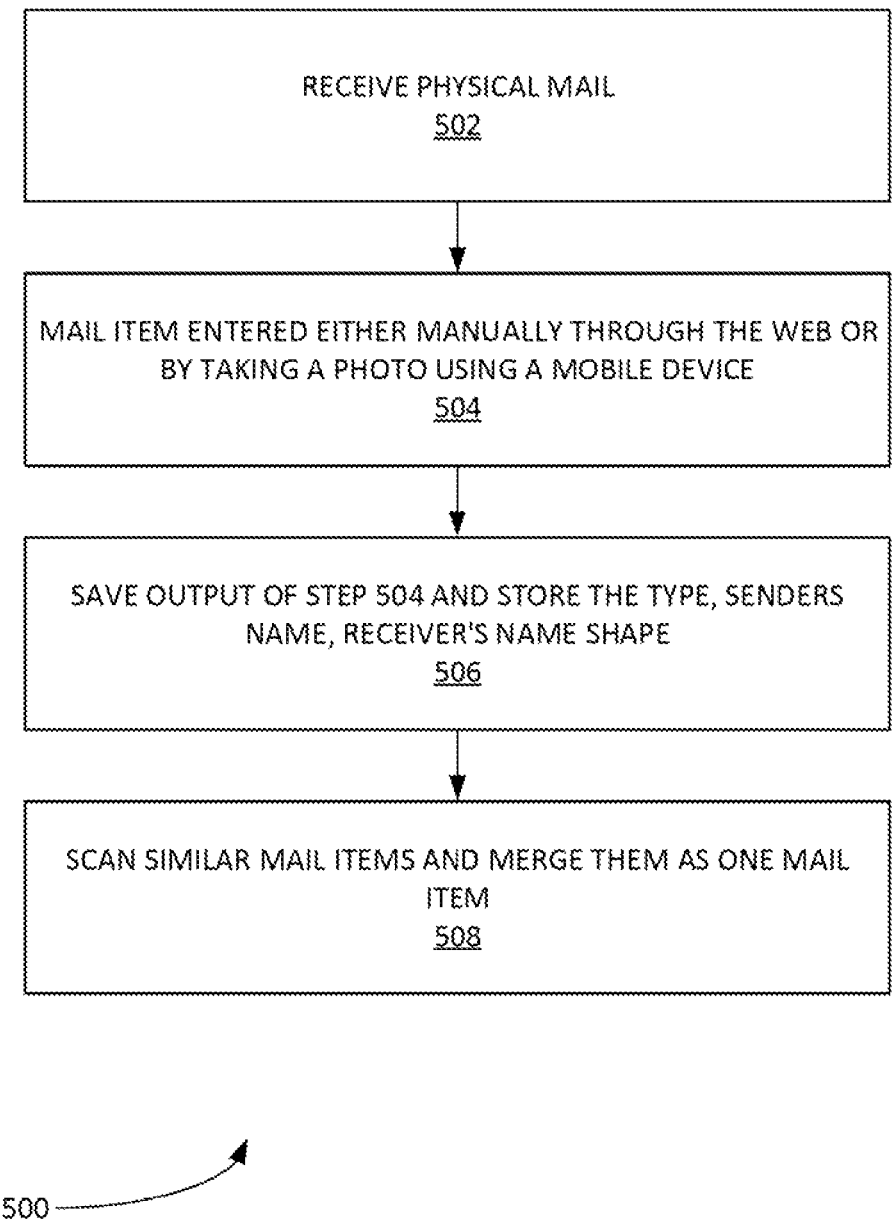
FIG. 5 illustrates an example process for grouping and/or batching a virtualized-mail entry with historical memory, according to some embodiments.

FIG. 5 illustrates an example process 500 for grouping and/or batching a virtualized-mail entry with historical memory, according to some embodiments. In step 502, a postal mail is received. In step 504, the postal mail item is entered (e.g. scanned with OCR system, digital photograph(s) taken, etc.) and either manually through a web page and/or with a digital photograph using a mobile device. In step 506, process 500 saves the output of step 504 (e.g. a data store) and remembers the type, senders name, receiver's name shape. In step 508, a background process scans similar physical mail items (e.g. to a same recipient as output of step 504) in a same manner and merges all the similar as one virtualized mail item. Similarity can be determined by a substantial identity of the recipient (e.g. same name, same address, etc.).

In one example of process 500, a similar mail item arrives. Process 500 can obtain a digital photo of the letter or parcel shipping label. Process 5000 can scan a similar postal mail item and automatically enters the postal mail item into the system with the same type and other already captured data from previous entries. Process 500 can enter the sender's information. Process 500 then scans one or more similar mail items and automatically saves these with the other already captured data from previous entries. In some examples, process 500 can include an automatic junk mail recognition functionality that can identify junk mail. Process 500 can notify the user of archived junk mail. Junk mail can be stored in a separate file/location as other virtual mail. It is noted that a user can also mark virtual mail as junk mail. Process 500 can use various techniques to identify junk mail such as, inter alia: information on the label, post card, sender identity, etc.

Figure 6:
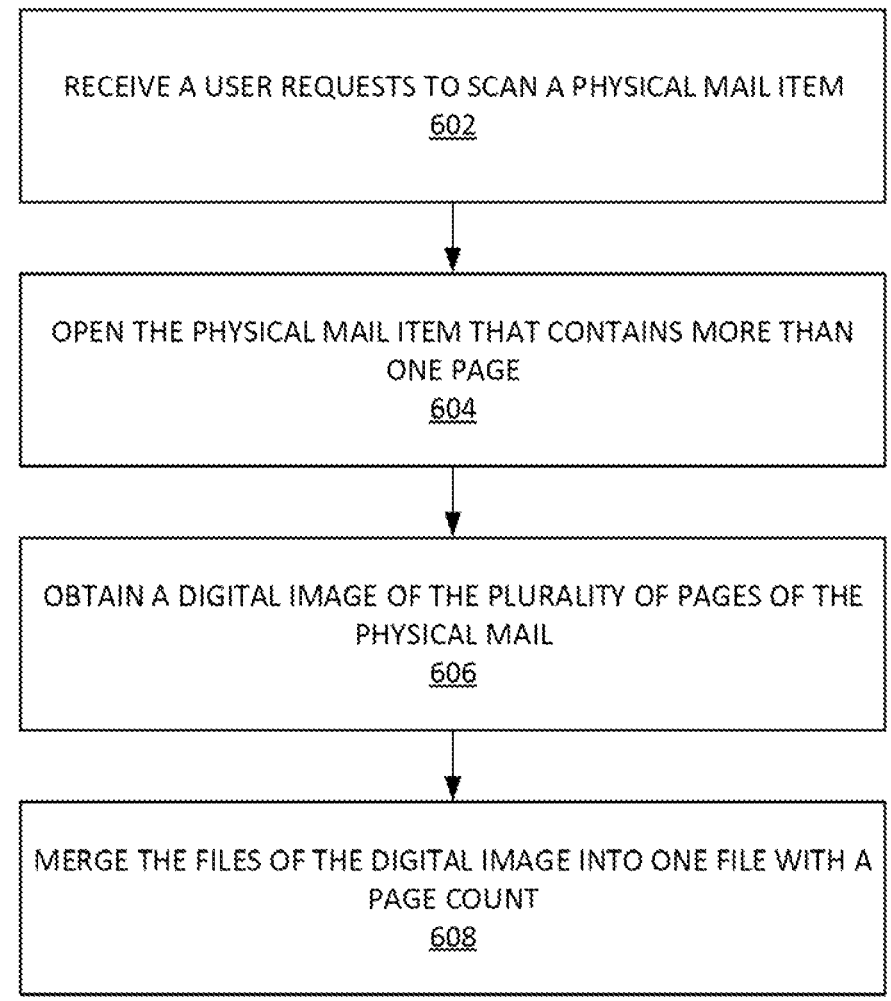
FIG. 6 illustrates an example process for file merging on scan requests, according to some embodiments.

FIG. 6 illustrates an example process 600 for file merging on scan requests, according to some embodiments. In step 602, process 600 receives a user requests to scan a physical mail item. In step 604, process 600 opens the physical mail item that contains more than one page. In step 606, obtains a digital image of the plurality of pages of the physical mail. In step 608, process 600 merges the files of the digital image into one file with a page count. It is noted that process 600 supports various digital image file formats.

Figure 7:
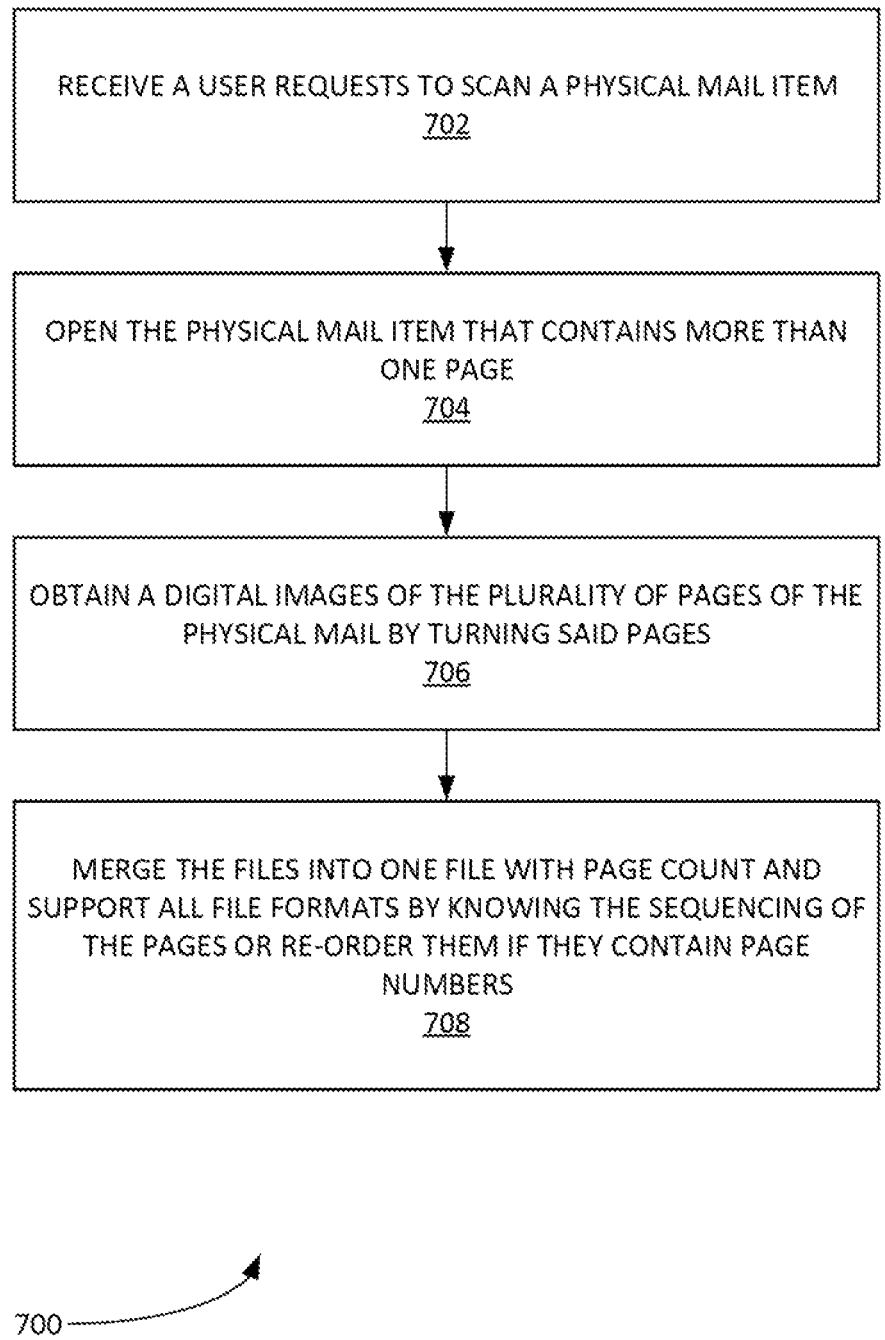
FIG. 7 illustrates an example process for scanning double-sided documents, according to some embodiments.

FIG. 7 illustrates an example process 700 for scanning double-sided documents, according to some embodiments. In step 702, process 700 receives a user requests to scan a physical mail item. In step 704, process 700 opens the physical mail item that contains more than one page. In step

706, process 700 can obtain a digital images of the plurality of pages of the physical mail by turning said pages. Turning can be implemented by a robotic page turner in one example. In step 708, process 700 can merge the files into one file with page count and support all file formats by knowing the sequencing of the pages or re-order them if they contain page numbers.

Figure 8:
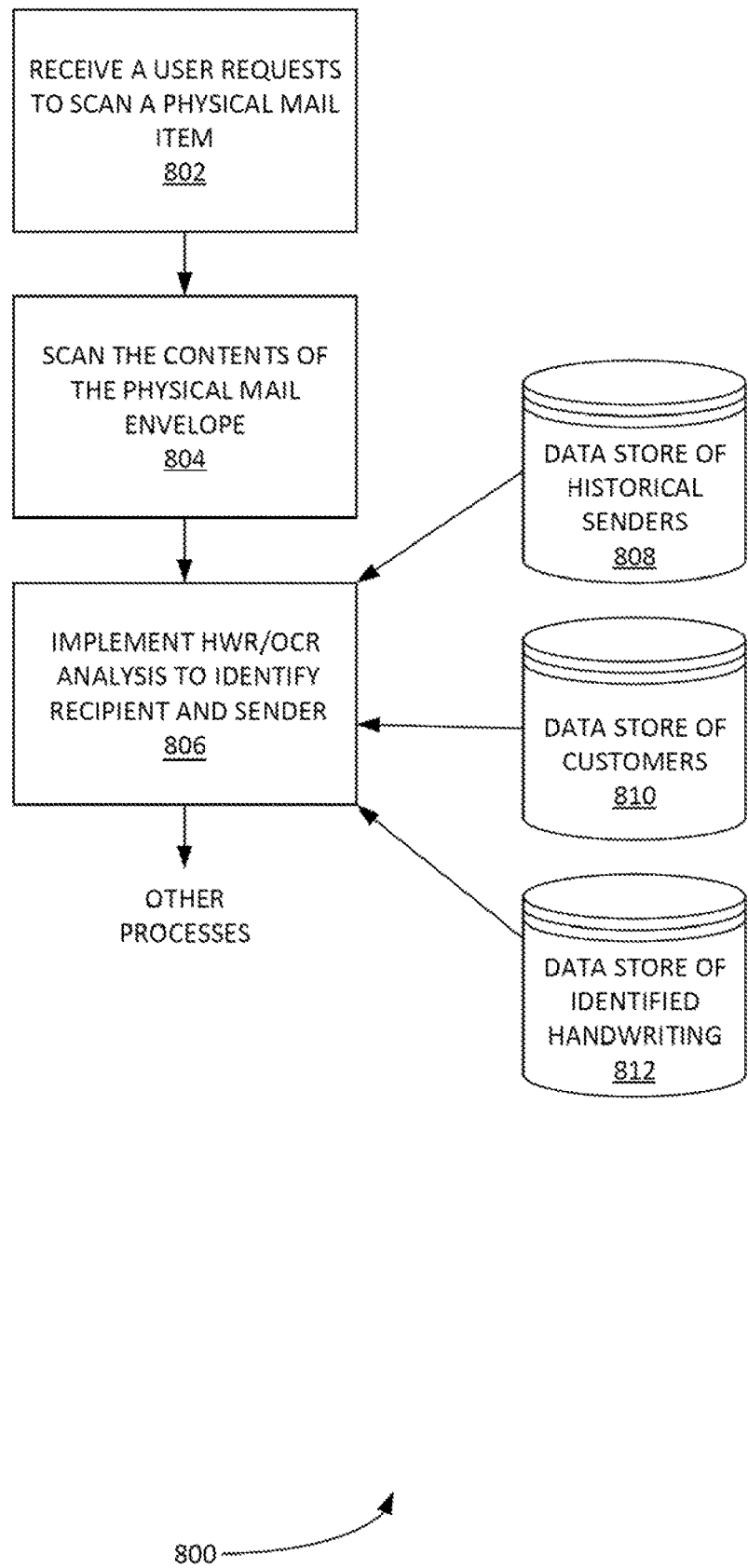
FIG. 8 illustrates an example process for HWR of physical mail envelopes, according to some embodiments.

FIG. 8 illustrates an example process 800 for HWR of physical mail envelopes, according to some embodiments. In step 802, process 800 can receive a user request(s) to scan a physical mail item. Process 800 can scan the physical envelope in step 804.

In step 806, implement HWR/OCR analysis to identify recipient and sender. In one example, region(s) of the envelope associated with a sender's identity and address data (e.g. upper left-hand corner of an envelope) can be scanned and the data stored. The region(s) of the envelope associated with the receiver's identity and address data can be scanned and the data stored. It can be determined that the part or all of the stored data is from a hand-written information. This hand-written information can be automatically converted to a text and/or letter codes which are usable within computer and text-processing applications. The data obtained by this form is a static representation of handwriting. Data from datastores 808-812 can be used for the HWR analysis (e.g. for problem domain reduction, etc.). For example, it is known that the receiver's identity and address is limited to an identity and address in data store of customers 810. Accordingly, data store of customers 810 can be used for problem domain reduction. Additionally, data store of identified handwriting 812 can be used to match past known handwriting samples with present handwriting under analysis, as well as, problem domain reduction. Furthermore, machine learning can be used to refine HWR functionalities based on past handwritten physical mail samples. A frequency of sender identity to receiver identity can be used to increase accuracy of the HWR functionality as well. Process 800 can be used to identity of one of several users associated with a specified address (e.g. a specified family member's names, a specific employees name, etc.).

In one example, neural network recognizers learn from an initial image training set. The trained network then makes the character identifications. Each neural network uniquely learns the properties that differentiate training images. It then looks for similar properties in the target image to be identified. Feature extraction can be used by the neural network recognizers. Various example properties can include, inter alia: aspect ratio; percent of pixels above horizontal half point; percent of pixels to right of vertical half point; number of strokes; average distance from image center; is reflected y axis; is reflected x axis; etc. This approach can provide the recognizer algorithm more control over the properties used in identification. Historical handwriting samples from previous senders can be used to train and continuously improve the neural network recognizers. Human curation can also be used to train and continuously improve the neural network recognizers.

In one example, the system can automatically recognize the receiver's information by: receiver's name; receiver's mailbox number; receiver's company name; any additional recipient names instead of the account holder name.

Figure 9:
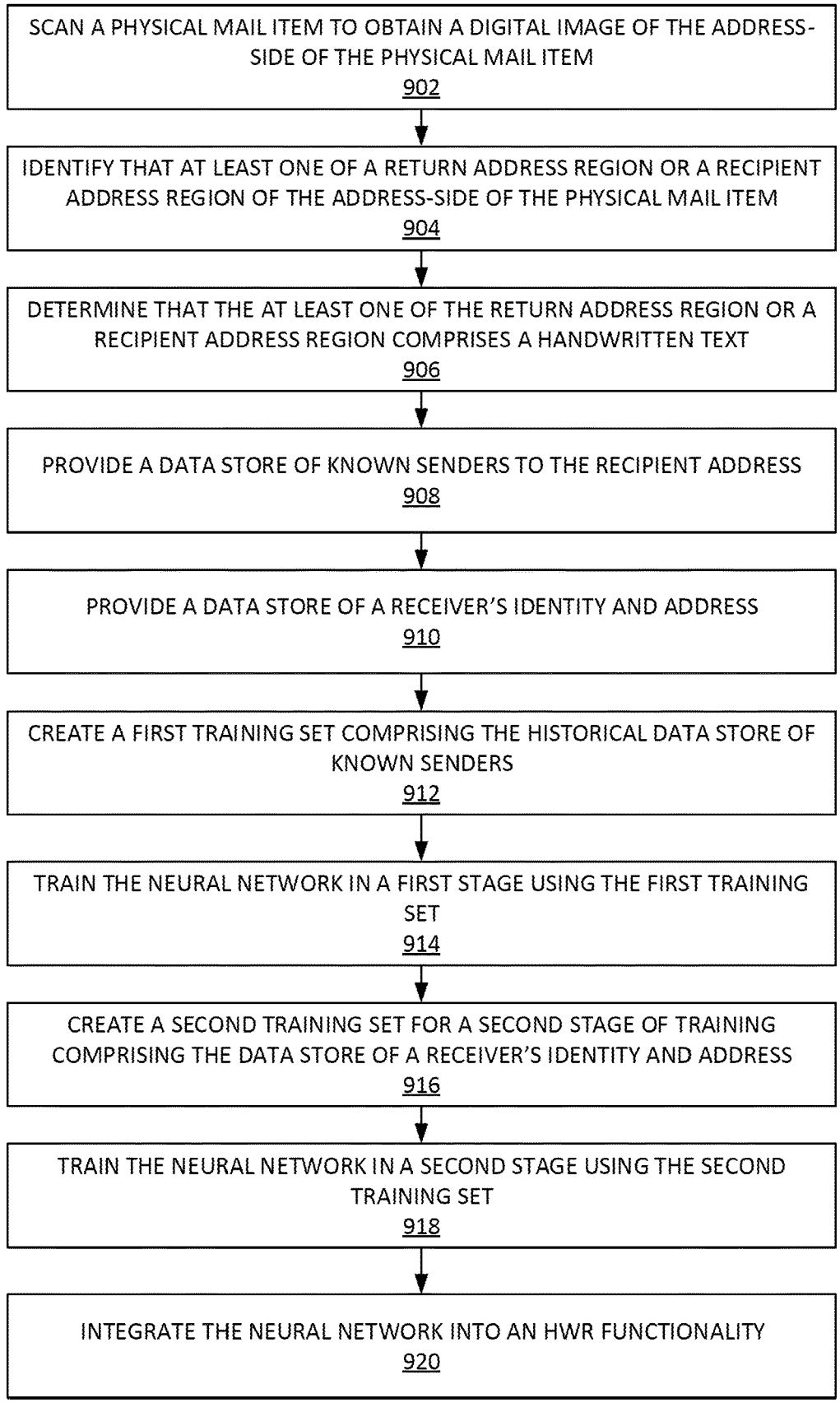
FIG. 9 illustrates an example process for handwriting recognition (HWR) on physical mail envelopes addressed to a user, according to some embodiments.

FIG. 9 illustrates an example process 900 for handwriting recognition (HWR) on physical mail envelopes addressed to a user, according to some embodiments. In step 902, process 900 can scan a physical mail item to obtain a digital image of the address-side of the physical mail item. In step 904, process 900 can identify that at least one of a return address region or a recipient address region of the address-side of the physical mail item. In step 906, process 900 can determine that the at least one of the return address region or a recipient address region comprises a handwritten text. In step 908, process 900 can provide a data store of known senders to the recipient address. The data store of known senders includes a data store of return address information in a known sender handwriting samples and a data store of receiver address information in the known sender handwriting samples. In step 910, process 900 can provide a data store of a receiver's identity and address. In step 912, process 900 can create a first training set comprising the historical data store of known senders. In step 914, process 900 can train the neural network in a first stage using the first training set. In step 916, process 900 can create a second training set for a second stage of training comprising the data store of a receiver's identity and address. In step 918, process 900 can train the neural network in a second stage using the second training set. In step 920, process 900 can integrate the neural network into an HWR functionality.

Figure 10:
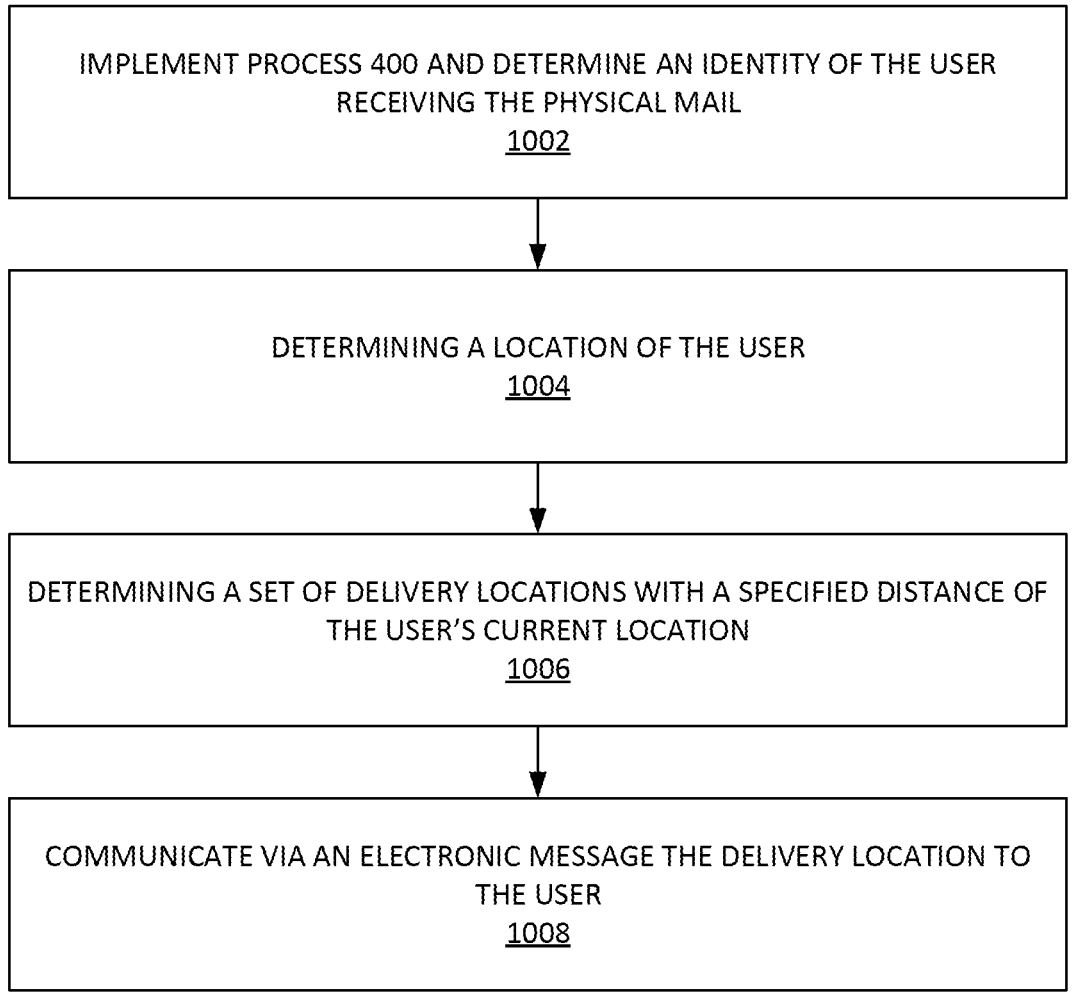
FIG. 10 illustrates an example process for dynamic location-based virtualized mail services, according to some embodiments.

FIG. 10 illustrates an example process 1000 for dynamic location-based virtualized mail services, according to some embodiments. In step 1002, process 1000 can implement process 400 and determine an identity of the user receiving the physical mail.

In step 1004, process 1000 can determine a location of the user. Various location-based services can be used. For example, the user's mobile device can include an application that uses a GPS-based location system to locate the user. The user's location can be inferred in some cases as well (e.g. based on historical routines, locations; based on intended locations as obtained from a user's use of a navigational service; etc.). This location information can be stored in a secure and encrypted data for querying by process 1000.

In step 1006, process 1000 can determine a set of delivery locations with a specified distance of the user's current location. For example, a self-service package delivery service can be utilized. Users can select any locker/mailbox location in a local region (e.g. with a specified distance from the user's current location) as their delivery address and retrieve their orders at that location by entering a unique pick-up code on the touch screen.

In step 1008, process 1000 can communicate via an electronic message the delivery location to the user. In one example, this can be done through a mail-management application on the user's mobile device. The user can also manage delivery locations in the mail-management application.

Figure 11:
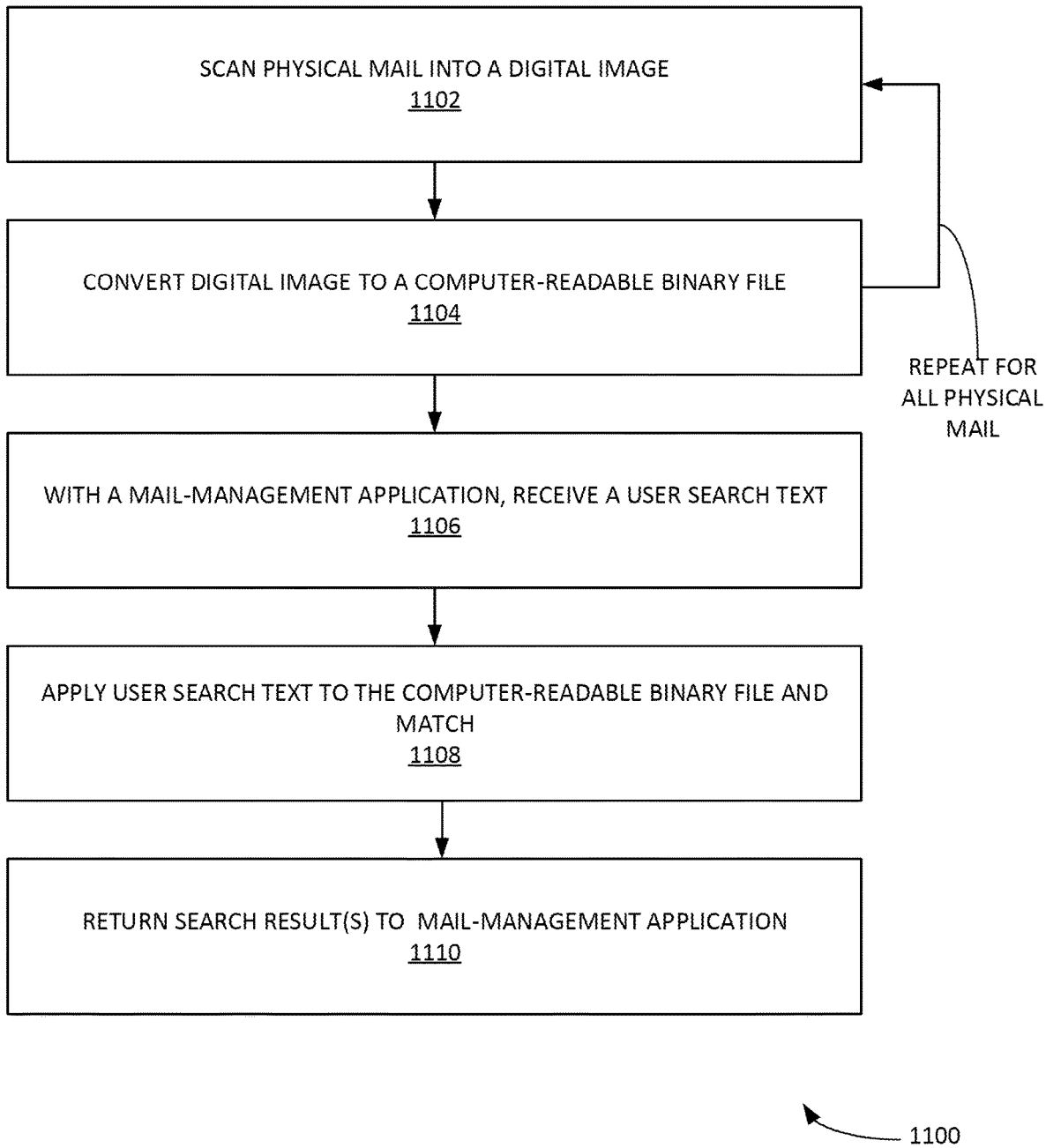
FIG. 11 illustrates an example process for implementing a computerized search of the contents of physical mail, according to some embodiments.

FIG. 11 illustrates an example process 1100 for implementing a computerized search of the contents of physical mail, according to some embodiments. In step 1102, process 1100 can scan physical mail into a digital image. In step 1104, process 1100 can convert digital image to a computer-readable binary file and/or a text file. An OCR process can be implemented on the digital image. The output of step 1104 can be a computer-readable file that is searchable with a specified type of search query. Accordingly, in step 1106, process 1100 can, with a mail-management application, receive a user search text.

In step 1108, process 1100 can apply user search text to the computer-readable binary file (and/or other readable text file) and match. In step 1110, process 1100 can return search result(s) to mail-management application. The user can then user the mail-management application to review and take various actions on digital versions of their received physical mail.

Figure 12:
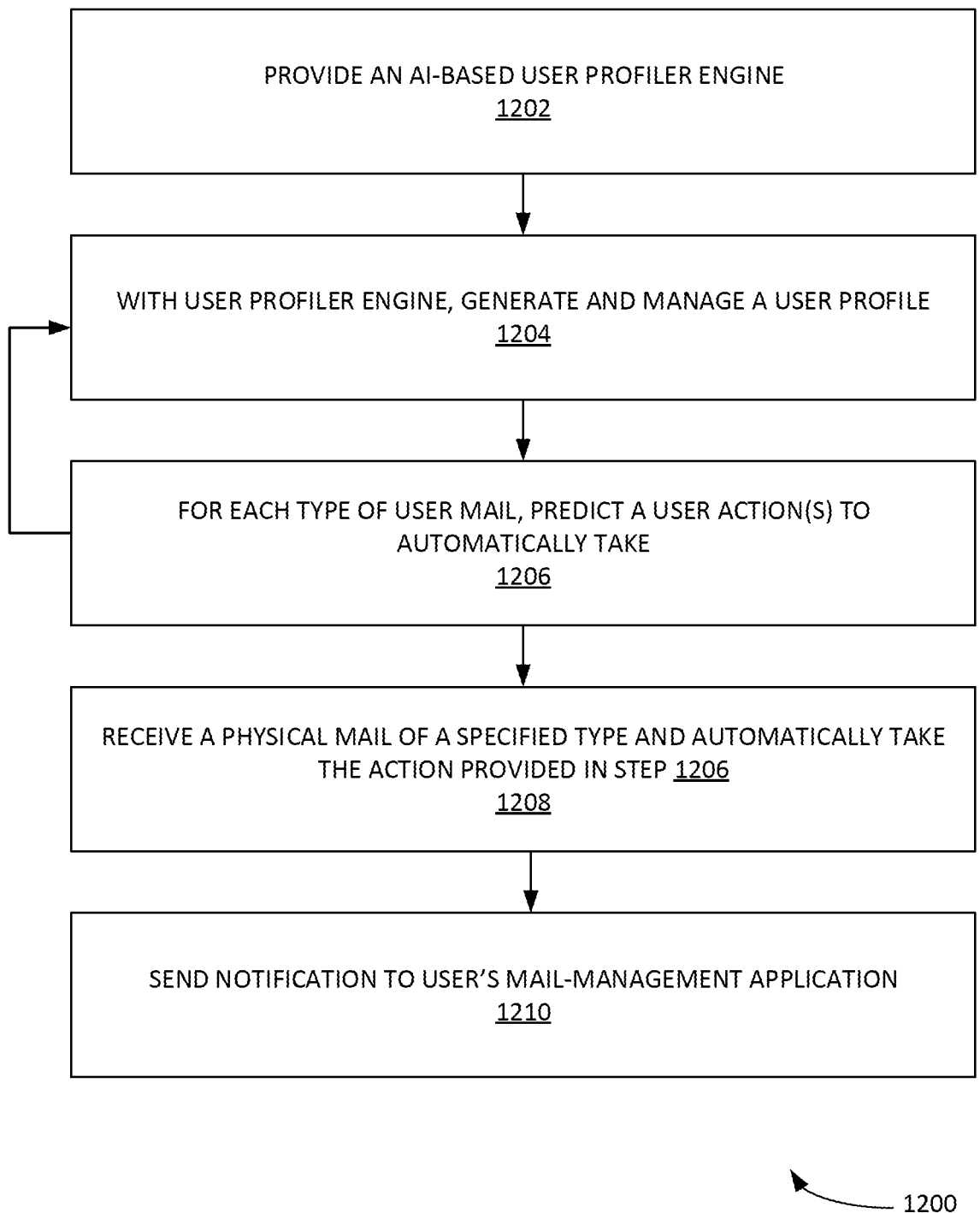
FIG. 12 illustrates an example process for automating virtualized mail services with an AI-based user profiler engine, according to some embodiments.

FIG. 12 illustrates an example process 1200 for automating virtualized mail services with an AI-based user profiler engine, according to some embodiments. In step 1202, process 1200 can provide an AI-based user profiler engine.

In step 1204, process 1200 can, with the user profiler engine, generate and manage the user profile. In step 1206, process 1200 can, for each type of user mail, predict a user action(s) to automatically take.

This can be done on a periodic basis. Various machine learning methods discussed supra can be utilized. Moreover, process 1200 can leverage user feedback to provide for a supervised machine learning process. For example, process 1200 can query a user to determine that a specified type of action that is the result of an ML process is correct. This user feedback can be stored and used to update/personalize the AI-based user profiler engine.

In step 1208, process 1200 can receive a physical mail of a specified type and automatically take the action provided in step 1206. In step 1210, process 1200 can send notification to user's mail-management application that the action has been taken. The user can optionally reverse/update the action. The user's feedback can be used to update an ML model used by the AI-based user profiler engine.

In one example, process 1200 detect when an administrator (e.g. human or bot) enters new mail item for a physical mail received that is addressed to the user. The administrator can identify an item as invoice, receipt, etc. Process 1200 can identify any subject matter and then take automatic action (e.g. auto pay invoice, auto pay receipt, auto send doc to a specified third-party system, etc.). As noted supra, an administrator can be a human or bot system (e.g. mail opener system, scanner, mail content analysis and input system, etc.).

It is noted the system 100 can implemented processes 1000-1200 as well. System 100 can include a server-side system for managing and implementing mail-management application(s) in a user's mobile device(s).

In one example, process 1200 can generate QR Codes for every mail item inserted and make it available for printing. For example, a physical mail can arrives. The mail items inserted through a machine feeder and the end user is notified automatically through AI by matching with match it with an applicable database for AI-QR code is printed on the envelope that contains the mail ID, sender and receiver and insert date info to match it with applicable database. This ca be for inventory purposes. Envelope photos can also be stored in the applicable database. The end user requests an envelope photograph. The system automatically releases and downloads the photo to the customer for a fee. The end user requests to scan the mail item content. The process can use the QR code to find the mail item and its location via GPS polling and where is was scanned last. When a mail is forwarded or picked up or shredded—QR code is scanned to release the mail item

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method useful for dynamic location-based virtualized mail services comprising:
   determining an identity of a user receiving a physical mail;
   determining a location of the user;
   determining a set of delivery locations within a specified distance of the user's current location; and
   communicating, via an electronic message, the delivery location to the user's mobile device,
   wherein the step of determining the identity of the user receiving a physical mail comprises:
   receiving a physical mail;
   taking a set of digital photographs of the physical mail envelope and a content of the physical mail, and
   wherein the step of determining the identity of the user receiving a physical mail comprises:
   implementing an OCR operation of the set of digital photographs to generate an OCR content of the physical mail; and
   determining a recipient, wherein the user is the recipient;
   wherein the step of determining the identity of the user receiving a physical mail comprises:
   automatically saving the OCR content of the physical mail and the recipient to a database, and
   wherein a user's mobile device include a mail-management application that uses a GPS-based location system to locate the user, and
   wherein the user's location is inferred based on at least one historical routine route of a user, and
   wherein a machine learning method is used to detect a junk mail; and
   using another specified machine learning method to optimize a processing of a plurality of user requests, wherein the plurality of user requests comprises: requesting a scan of the physical mail, requesting a shredding operation of the physical mail, and requesting a forwarding of a specified mail based on a sender,
   wherein the step of determining the set of delivery locations within the specified distance of the user's current location utilizes a location of a self-service package delivery service and enables the user to select a mailbox at the location as their delivery address and retrieve their orders at that location by entering a unique pick-up code on the touch screen to open the mailbox.

2. The computerized method of claim 1, wherein the user's location is inferred based on an intended location of a user as obtained from a user's use of a navigational service as retrieved from a navigation application in the user's mobile device.

3. The computerized method of claim 2, wherein the step of communicating, via an electronic message, the delivery location to the user's mobile device uses a push notification through the mail-management application on the user's mobile device.

4. The computerized method of claim 3 further comprising:
    determining that a user has opened the mailbox and retrieved the physical mail item.

5. A computerized system useful for dynamic location-based virtualized mail services comprising:
    at least one processor configured to execute instructions;
    at least one memory comprising instructions that when executed on the at least one processor, causes the at least one processor to perform operations that:
        determine an identity of a user receiving a physical mail;
        determine a location of the user;
        determine a set of delivery locations within a specified distance of the user's current location; and
    communicate, via an electronic message, the delivery location to the user's mobile device, wherein the step of determining the identity of the user receiving a physical mail comprises:
        receiving a physical mail;
        taking a set of digital photographs of the physical mail envelope and a content of the physical mail, and
    wherein the step of determining the identity of the user receiving a physical mail comprises:
        implementing an OCR operation of the set of digital photographs to generate an OCR content of the physical mail; and
        determining a recipient, wherein the user is the recipient;
    wherein the step of determining the identity of the user receiving a physical mail comprises:
        automatically saving the OCR content of the physical mail and the recipient to a database, and
    wherein a user's mobile device include a mail-management application that uses a GPS-based location system to locate the user,
    wherein the user's location is inferred based on at least one historical routine route of a user, and
    wherein a machine learning method is used to detect a junk mail; and
    using another specified machine learning method to optimize a processing of a plurality of user requests, wherein the plurality of user requests comprises: requesting a scan of the physical mail, requesting a shredding operation of the physical mail, and requesting a forwarding of a specified mail based on a sender,
    wherein the step of determining the set of delivery locations within the specified distance of the user's current location utilizes a location of a self-service package delivery service and enables the user to select a mailbox at the location as their delivery address and retrieve their orders at that location by entering a unique pick-up code on the touch screen to open the mailbox.

6. The computerized system of claim 5, wherein the user's location is inferred based on an intended location of a user as obtained from a user's use of a navigational service as retrieved from a navigation application in the user's mobile device.

7. The computerized system of claim 6, wherein the step of communicating, via an electronic message, the delivery location to the user's mobile device uses a push notification through the mail-management application on the user's mobile device.

\* \* \* \* \*